Dec. 24, 1963  B. R. BETTER  3,115,029
TORQUE TESTER
Filed March 21, 1961  2 Sheets-Sheet 1
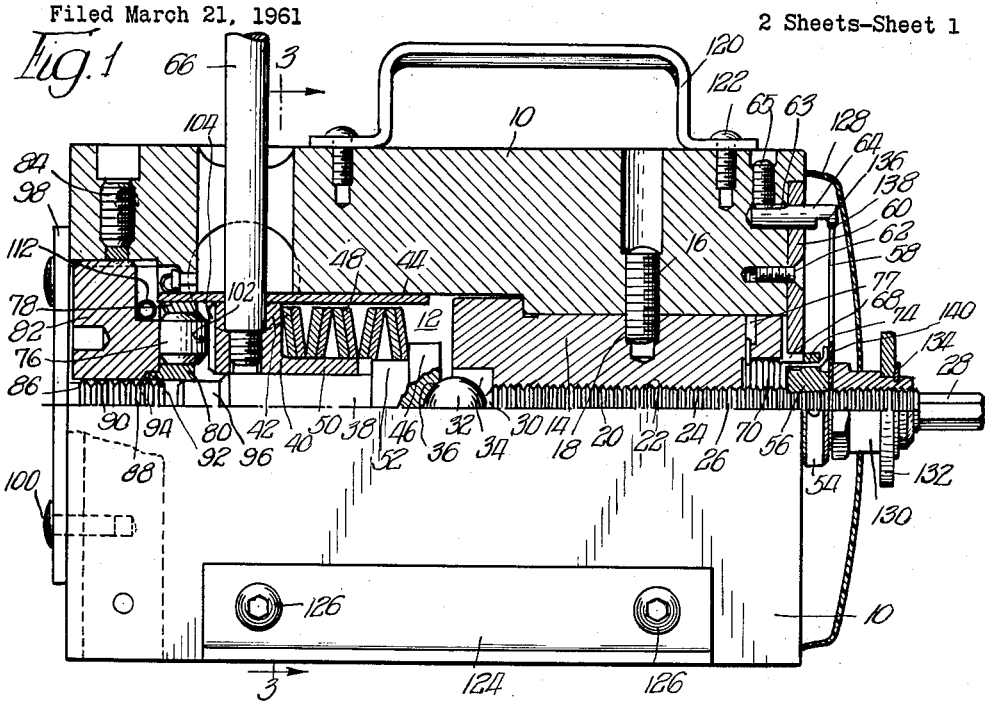
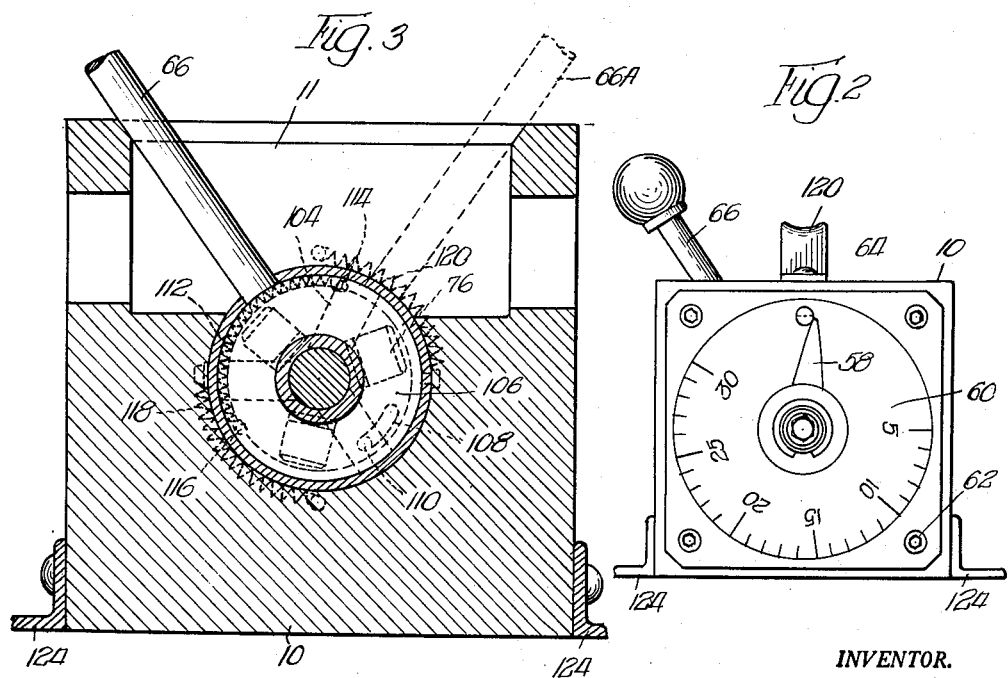
INVENTOR.
Bernard R. Better,
BY
Brown, Jackson, Boettcher & Dienner
attys Dec. 24, 1963
B. R. BETTER
3,115,029
TORQUE TESTER
Filed March 21, 1961
2 Sheets-Sheet 2
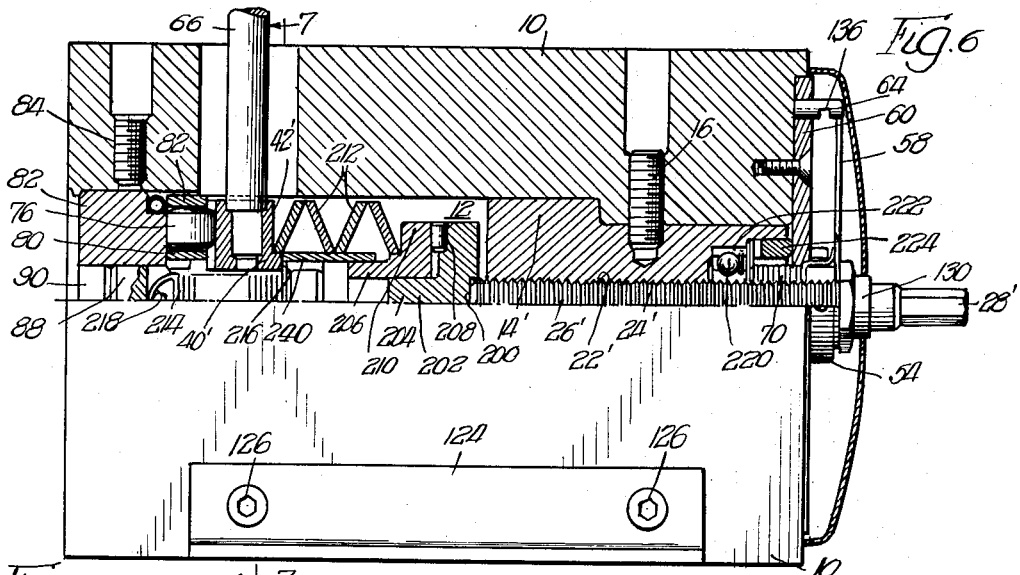
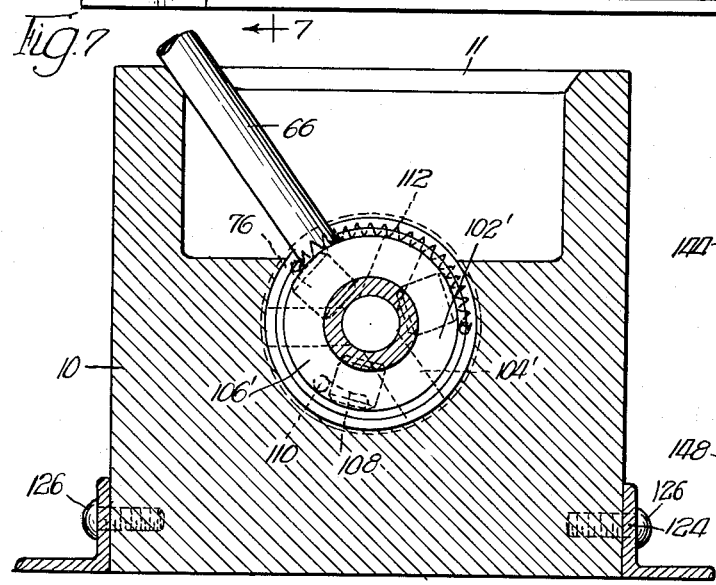
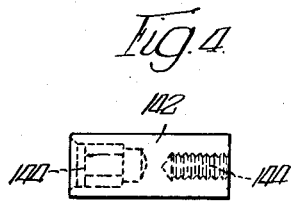
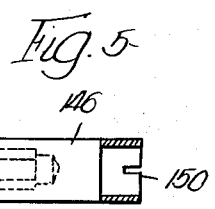
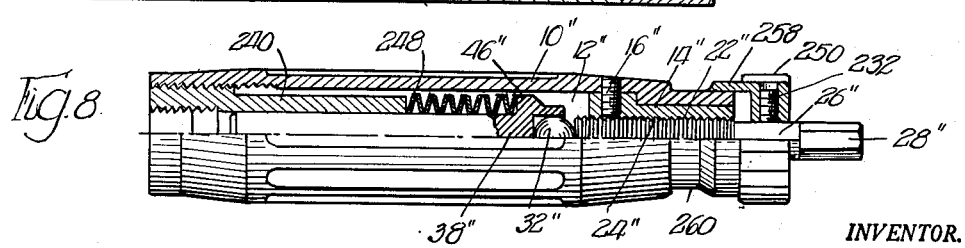
INVENTOR.
Bernard R. Better,
BY
Brown, Jackson, Boettcher & Dienner United States Patent Office 3,115,029
Patented Dec. 24, 1963

3,115,029
TORQUE TESTER
Bernard R. Better, Chicago, Ill., assignor to Scully-Jones and Company, Chicago, Ill., a corporation of Illinois
Filed Mar. 21, 1961, Ser. No. 97,206
12 Claims. (Cl. 73—1)

This invention relates to force measuring devices, and more particularly to devices for measuring or checking the dynamic torque output of a rotary tool.

A principal object of the invention is to provide a novel and improved torque measuring device which is useful for testing, checking, or calibrating the dynamic torque of screwdrivers, nutsetters, and similar tools, both hand and power operated, as well as fastenings made thereby. Such tools may be divided into two general classes, those of the class having a positive clutch drive, i.e., are so constructed that torque may be applied to the workpiece up to the limit of capacity of the tool. Tools of the other class have an adjustable clutch arrangement which allows the tool to be preset to the torque requirements of a particular job, so that the tool "breaks" or its clutch slips when the desired tension has been reached. These settings are, however, subject to wear and/or change, so that there is also a need to be able to regularly check the torque settings of such tools.

In accordance with the above general object, a more specific object of the invention is to provide a dynamic torque tester which is essentially mechanical in its operation to the end that it will be rugged in its construction, so as to be able to withstand rough treatment and be useful on the production line, yet provide a high degree of accuracy in its torque measuring function.

Such a device should be of a construction that can be conveniently and economically manufactured and should be uncomplicated in its operation and convenient to use. To these ends, a further object of the invention is to provide a construction of dynamic torque tester which unlike prior art structures, and particularly these relying on hydraulic systems, will be immediate in its response, present a minimum of inertia so as to have maximum efficiency as well as accuracy in its recording of the applied torque, and in addition will hold a recording of the applied torque even after the applied torque has been removed but which recording can readily be wiped out at the will of the operator and the device reset for the next check.

In accordance with the above aims and objects, a further and more specific object of the invention is to provide a construction of torque tester in which the torque of a rotary tool under check will be received by one end of a torque screw threadedly connected into the internally threaded bore of a bushing and which device includes a compressible spring assembly to resist the forward longitudinal thrust of the screw as it is turned on the threads of the bushing, the friction characteristics of the threaded connection being so controlled that there is a direct relation between the compression of the spring assembly and the angle through which the torque screw is turned, and whereby the latter may be used as an accurate measure of the applied torque.

A feature of the invention is that the threaded bushing and torque screw are so constructed that the screw rotates freely and that the materials of which the bushing and torque screw are composed and the mating threads of their connection are so finished that the friction condition existing therebetween is stable, wherefore the compressive force on the spring assembly accurately reflects the applied torque, and also that the coefficients of friction between said threads if not constant are at least stable through a range of pressures for a particular speed of rotation of the applied torque. This is to say that although the friction coefficient for one pressure at a given speed may vary and have no apparent correlation to the friction coefficient which exists under a different condition of pressure and speed, at a particular speed and pressure the coefficient of friction does not change when the conditions are repeated and to this extent is constant and predictable.

Thus a further feature of the invention is that because the friction condition between the threaded connection of the torque screw and bushing is stable, the mechanical efficiency of the connection is also stable and a definite relation exists between the angular movement of the torque screw and the torque applied thereto, and so that a scale may be calibrated for a direct reading of the applied torque which will have a high degree of accuracy.

A further feature of the invention is that the forward thrust of the torque screw is translated through suitable bearing means to a separate thrust member on which the compressible member directly acts and which thrust member is confined to axial movements, which arrangement further improves the relation between the angular movements of the torque screw and the applied torque. To this end, in the preferred embodiment, the rotational movement of the torque screw is also translated into forward axial motion of the thrust member through a single bearing ball.

Still another feature of the invention is that by reason of its construction, the torque screw resists turning when the applied torque is removed so that the reading is not lost, the selected or prevalent friction coefficient between the mating threads and their helix angle, making the connection essentially self-locking. However, by relieving the counter force built up in the spring assembly, the torque screw can be readily rotated back to its original setting.

Thus, still a further feature of the invention is the provision of novel releasing means, such as a cam, which may be manually operated to relieve the spring assembly and permit it to return to its normal relaxed and expanded state.

Still another feature of the invention is to provide a pointer which will turn with the torque screw and having a scale associated therewith, from which a direct reading of the torque applied to a rotary tool fastened to the device may be read, the pointer holding its position on unfastening of the tool and until the compression of the spring assembly is relieved as aforementioned, and wherein resilient means are associated with the pointer having a force sufficient to overcome the low friction force of the threaded connection so as to provide for automatic return of the pointer to its initial position when compression of the spring assembly is released. It is further contemplated that although the force of said resilient means, which may be a torsion spring, will be sufficient to overcome the friction between the mating threads of the torque screw and bushing, the torsion thereof will nevertheless be so slight as not to have any significant effect on the much higher torque which the device is intended to measure and/or check.

Many other objects, features and/or advantages of the invention will be apparent or will become so from the detailed description of preferred embodiments of the invention which will now be described, and as illustrated in the several views which the accompanying sheets of drawings comprise.

Therefore now referring to the drawings, wherein like parts are identified by like reference numerals:

FIGURE 1 illustrates one embodiment of the invention in side elevation, the upper half being sectioned to show details in the construction thereof;

FIGURE 2 is an end view of the embodiment of the invention illustrated in FIGURE 1 and shown on a slightly smaller scale;

FIGURE 3 is a sectional view of said embodiment taken along lines 3—3 in FIGURE 1, and looking in the direction indicated by the arrows;

FIGURES 4 and 5 illustrate adapters for use with the devices constituting the invention;

FIGURE 6 is a view generally similar to FIGURE 1 illustrating a second embodiment of the invention;

FIGURE 7 is a cross-sectional view of the second embodiment taken along lines 7—7 of FIGURE 6 looking in the direction indicated by arrows; and FIGURE 8 is a view generally similar to FIGURES 1 and 6 showing still another embodiment of the invention.

Referring now to the several views, and first to FIGURES 1, 2 and 3, a preferred embodiment of the invention is there shown comprising a housing which consists of a casting 10 having a central bore 12 in one end of which is fixed a bushing 14 held against rotation by means of a set screw 16, one end of the screw extending within a provided opening 18 in the bushing 14. Bushing 14 is axially bored as at 20 and has screw threads 22 which mate with the screw threads 24 of a torque screw 26 having an outer hexagonal-shaped end 28 which is fastened to the driving end of the rotary tool, the torque of which is to be measured by the device. The opposite end 30 of the torque screw 26 engages a steel ball 32 freely rotatable although confined between a cylindrical recess 34 in the end of bushing 14 and a partially spherical concaved recess 36 in the adjacent end of a thrust pin 38. Rotatably mounted about the stem of thrust pin 38 is a flanged member 40. Between the outer edge of the flanged portion 42 of said member 40 and the wall of bore 12 is a sleeve 44. The head of thrust pin 38 is suitably shouldered as at 46 so that with the flanged portion 42 it serves to confine compressible spring assembly comprising a plurality of cup-shaped or convexo-concave spring washers 48 which encircle the stem of the thrust pin 38. Extension portion 50 of member 40 as well as portion 52 of the head of thrust pin 38 have aligned cylindrical surfaces cooperating with the inner cylindrical surface of sleeve 44 to maintain said spring washers 48 in assembled relation. As indicated in FIGURE 1, said washers 48 are for example arranged in pairs, such that alternate pairs having their concave sides facing each other and other pairs having their convex sides facing each other. Any other appropriate arrangement of the spring washers and/or other forms of compressible springs may be substituted therefor. For example, the spring washers might be be arranged to permit expanding the scale at the low torque readings as by making the spring assembly deflect at a higher rate at small forces at the start of the deflection.

From the structure thus far described, it will be readily recognized that the effect of applying torque to end 28 of screw 26 will be to move the torque screw 26 axially inwardly to the left of FIGURE 1 as it turns about its threaded connection with bushing 14, end 30 of the screw 26 transferring said longitudinal movement to thrust pin 38, ball 32 serving to limit translation of the rotary movement of the screw 26 to the thrust pin, but not its longitudinal movement. Extension 50 of member 40 is dimensioned to have a close sliding fit about the stem of the thrust pin 38 which effectively limits side thrust movement thereof, but allowing it freedom to move axially. Conversely, member 40 is also slidable axially relative to the thrust pin 38, as well as rotatable thereabout for a reason which will hereinafter be made clear. Normally, however, member 40 is held against sliding movement by means as will hereinafter be described and wherefore the compressible spring represented by cupped washers 48 is confined between flanged portion 42 and the shoulder portion 46 of the thrust bolt so as to be compressed by any such axial movement of the thrust pin and provides a counter or resisting force on the mating threads of the screw 26 and its bushing proportional to the torque applied to the end 28 of said torque screw 26.

On torque screw 26 is a retainer ring keyed thereto at 56 so that it turns with screw 26. Welded or otherwise suitably fastened to the retainer ring 54 is a pointer 58 with which there is associated a scale member 60 fastened to the face of housing 10 by screws 62, said scale being so calibrated that the angle of displacement of the pointer 58 as it turns with the torque screw 26 may be utilized to indicate the amount of torque applied to end 28 of the screw 26. This is obtained by reason of the stable coefficients of friction which exist between the mating threads 22 and 24 of the threaded connection of the torque screw 26 in bushing 14 which cause a predictable part of the applied torque to be converted to longitudinal movement of the thrust pin 38 and wherefore the counter force of the spring washers 48 reflects the applied torque and so that the angular displacement of the pointer 58 has a direct relation thereto. In order that the coefficients of friction between the mating threads be stable, and therefore predictable, through a given range of pressures and speed of rotation of screw 26, it is important not only that the threads 22 and 24 of said bushing 14 and torque screw have a fine, smooth finish but the materials of which they are comprised are also of significance. Although it would be highly desirable that the coefficients of friction between the mating threads be constant through the contemplated range of pressures and speed at which torque is to be applied to the screw 26, it is sufficient if the coefficients of friction at least be stable and not appreciably change with usage and variables, such as temperature, specific pressures and speed. What is essential therefore is that the friction coefficient not fluctuate from a definite value for the same condition. For instance, if the friction coefficient of the threaded connection is .16 for a surface pressure of 2000 pounds and a speed of 60 feet per minute, it should have the same value each time torque sufficient to produce said surface pressure and speed is applied. It may, however, become 1.9 when a different pressure and different speed is introduced. The curve which said coefficients of friction establish need not be a straight line, but may be curved. However, it must be stable and therefore predictable. In the experiments thus far conducted, satisfactory results have been obtained where the torque screw 26 is formed of hardened steel and the bushing 14 of an oil impregnated sintered bronze material, such as that sold under the registered trade name "Oilite." This material has been described as akin to a metallic sponge, since it absorbs oil by immersion as readily as a sponge absorbs water, and usually contains approximately 20% oil by volume and which it meters by capillary action to the threads of the bushing when heat or pressure is present, as during the application of torque to end 28 of screw 26. In a particular size of torque screw and size length of bushing tested which were comprised of such materials, it was found not only that the friction coefficient remained stable over a range up to 2,000 pounds per square inch of surface pressure within the threads, but also that it remained essentially constant over said range. Bushing 14 and torque screw 26, however, may be made of other materials which will provide the necessary stable coefficients of friction through a selected range of surface pressures and speeds. For example, bushing 14 may be made of a self-lubricating non-metallic material, such as "Teflon."

Consequently, as soon as torque applied to end 28 of screw 26 reaches a value at which it can no longer overcome the resistance of the springs 48, the rotary tool stops or is stalled. At this point, the compression applied to the spring assembly bears a direct relation to the angle through which the torque screw is turned and the angular displacement of the point 58 is indicative of how much the washer 48 has been compressed. Since the coefficient of friction between the mating threads 22 and 24 of the torque screw and its bushing is stable as well as very low (preferably kept between .16 and .19 in the range of torque pressures and speed being tested), the mechanical efficiency of its screw and bushing assembly is also stable and a definite relation can be observed between the angular movement of the pointer 58 and the applied torque and on which scale 60 can be calibrated.

Furthermore, the compression of the spring washers 48 exerts a locking force on the mating threads, so that the screw cannot be readily back-turned unless a counter torque approximately equal to the original torque is applied or the force of the springs 48 is otherwise released. This means that when the rotary tool is removed from end 28, the angular displacement of pointer 58 holds so that a reading can be taken. In accordance with the invention means are provided however whereby it may be reset to wipe out the reading and prepare the torque tester for the next test. Referring to FIGURE 1, a stop pin 64 is shown located at the zero point of the dial 60 and against which the pointer 58 normally rests. As previously mentioned, dial 60 is suitably graduated so that the angular displacement of the pointer 58 may be directly read in terms of the amount of actual torque applied to the end 28 of the torque screw 26 by the rotary tool under test. In order to reset the pointer after one test has been completed and to ready the device for the next test, it is necessary that torque screw 26 as well as pointer 58 be returned to their original position, that is, with pointer 58 against stop 64. Referring to FIGURE 1, it will be noted that in accordance with the invention a torsion spring 70 encircles torque screw 26 having one end fastened to the bushing 14 by reason of its disposition in a provided slot 72 and has its opposite end extended through a suitably formed opening 74 in retainer ring 54 to which pointer 58 is fastened. The effect of this construction is of course that when pointer 58 and torque screw 26 are rotated by a force applied at 28, a resisting torsion is simultaneously developed in spring 70 which is greater than the frictional resistance developed between threads 22 and 24 of the bushing 14 and torque 26. At the same time it is nevertheless insignificant in comparison with the range of torques the device is intended to measure, and therefore need not always be taken into account in calibrating scale 60.

However, because the torsional force of the spring 70 does exceed the friction developed between threads 22 and 24 of the torque screw 26 and bushing 14, it can be brought into play to counter turn the torque screw 26 and return the pointer 58 to its zero position if means are provided to relieve the resisting force of the spring washers 48.

As illustrated in FIGURES 1 and 3, a plurality of rollers (in this instance three, although any other greater number thereof may be employed), are suitably supported by means of a cage ring 78 and a cage 80 on a nut 82 threadedly connected into the end of bore 12, said nut 82 serving to hold the rollers 76 in firm engagement against the under surface 102 of member 40. A set screw 84 is suitably located to prevent subsequent turning of nut 82 once the rollers 76 have been properly located with reference to the undersurface 102 of member 40. It will be noted that nut 82 also has an internally threaded bore in which are threadedly connected a pair of set screws 88 and 90. Set screw 88 serves to lock a flanged part 92 of cage 80 in a suitably recessed portion 94 of nut 82, so that the rollers 76 are properly centered. It will be understood that screw 88 is suitably spaced from the end of the thrust pin 38 to allow for longitudinal movement of thrust pin 38 in response to the inward threading of torque screw 26 in its bushing 14. Set screw 90 serves primarily as a locking screw to resist outward working of set screw 88. The entire end may be enclosed by a cover 98 suitably fixed to the housing 10 as by screws 100.

The surface 102 of member 40, which is engaged by the rollers 76 contains spaced radially extending cylindrically shaped shallow depressions 104 corresponding in number to the number of rollers 76 and with intervening lands 106. Normally, the rollers 76 engage with the lands 106.

Referring, however, to FIGURE 1, a handle 66 is shown connected to the flanged portion 42 of member 40, which extends through a provided recess 11 in housing 10. Movement of the handle 66 in said recess to the right of FIGURE 3 has the effect of rotating member 44 about the axis of thrust pin 38, and serves to bring the depressions 104 in its surface 102 into alignment with rollers 76. This, of course, permits member 40 to move farther to the left, as in FIGURE 1, so as to relieve the compression on the spring washers 48. With the thus permitted expansion of the spring washer 48 to an essentially relaxed state, the pressure thereof on the mating threads 22 and 24 of the bushing 14 and torque screw 26 is released, so that the counter torsion of the spring 70 now comes into play and forces the torque screw 26 to reversely turn and return the pointer 58 to its original or zero position against stop 64 ready for the next test.

Referring to FIGURE 3, an arcuate slot 108 is provided in cage 78 which receives a pin 110 carried by the nut 82. As the handle 66 is turned to the right of FIGURE 3, the rollers 76 move therewith but are soon caught in the depression 104. Pin 110 being mounted on nut 82 which does not move, remains stationary. Consequently when the opposite end of slot 108 engages the pin 110 further turning of the rollers 76 with the cam 40 ceases. However, because handle 66 has not yet reached the position indicated at 66A, the depressions of the cam surface 102 are rotated beyond the rollers and so that they again engage lands 106. Preferably, a tension spring member 112 is provided having one end secured to the ring 78 as at 114 and its opposite end to the nut 82 as at 116 to accomplish recentering of the rollers as handle 66 is moved to the opposite end of recess 11 and the rollers are released from their engagement in depressions 104 of the cam surface 102. Tension springs are also provided at 118 and 120, each suitably connected at one end to the body 10 and at their opposite ends to the sleeve 44. These serve to hold the arm 66 in tension at one end of recess 11.

If desired, a handle 120 may be suitably fastened to the body 10 as by screw means 122 to provide portability as well as manual leverage during the act of torque testing with the device. The device may also be attached to a vertical surface as the side of a bench or a wall by means of mounting flanges 124 shown fixed to housing 10 by suitable screws 126.

It will be further appreciated that, if desired, a cover 128 may be supported on locking nut 130 about torque screw so as to overlie and enclose the dial 60 and pointer 58, as well as stop pin 64. Desirably, such a cover will be made of plastic or other transparent material and in order to afford protection thereto against the possibility of a rotary tool being accidentally brought into contact therewith, a guard washer 132 may be mounted on the locking nut 130 and locked in place as by a snap ring 134.

It will be further appreciated that there will be circumstances where the applied torque will be such that more than a full turn is applied to the torque screw 26. For this reason, the stop pin 64 is notched at 136 immediately below its end area 138 to permit passage of the end of the pointer 58 beyond the pin when angularly displaced in excess of 360°. In order to hold the pointer 58 against sagging and so that it will properly engage area 138 when returned to its zero position, the end of the torsion spring 70 is brought through opening 74 in retainer ring 54 so that its end part 140 will resiliently bear upwardly against the pointer 58, as indicated in FIGURE 1. It will also be noted in said FIGURE 1 that stop pin 64 is adapted for sliding adjustment in a provided opening in the face of housing 10 and has a flattened surface 63 against which set screw 65 bears to hold the pin 64 in its adjusted position and to prevent rotation thereof.

Thus the invention provides a torque testing device in which the angular displacement of a pointer 58 mounted about the torque screw 26 may be read against a dial 60 to indicate the amount of torque applied by a rotary tool fastened to end 28. This record is not lost when the torque from the rotary tool applied to the end 28 is released, but may be retained at the convenience of the tester. However, the device may be reset be simply moving handle 66 from one side of the recess 11 to the other side and releasing. This effects rotation of cam portion 40 causing rollers 76 to be received into its depressions 104 which permit the spring assembly 48 to move the cam member 40 away therefrom to accommodate expansion of the spring and thereby release its pressure on the mating threads 22 and 24 of the torque screw 26 and bushing 14. The torsion of spring 70 is then sufficient to overcome the friction of the threaded connection of torque screw 26 in the bore of bushing 14 so that the pointer 58 returns to its zero position. Springs 118 and 120 act on sleeve 44 to return handle 66 to its original position.

Although a rotary tool may be directly fastened to end 28 of the torque tester, the working end thereof may not always be so constructed to fit on end 28. Also there will be occasions when it will be desirable to provide a part which simulates a fastener assembly. Thus in FIGURE 4 an adapter 142 is shown having a recessed end 144 which fits over the end 28 of the torque screw 26, its opposite end being recessed and internally threaded to simulate one part of a fastener assembly into which a screw or bolt is to be driven by the rotary tool. FIGURE 5 illustrates a second construction of an adapter. This adapter 146 also has a recess 148 shaped to fit over the end 28 of the torque screw 26, but having its opposite end provided with a kerf 150 to receive the tang of a power driven screw driver or the equivalent. Through use of such adapters, power tools on a production line can be tested without the need of their disassembly.

Turning now to FIGURES 6 and 7, a second embodiment of the invention is there shown of a construction generally similar to the preferred embodiment, but distinguishing therefrom in certain respects which will now be described. Thus, in this alternate embodiment of the invention, in place of a ball and thrust pin which translates axial movement of the torque screw to the resisting spring, the end of the torque screw 26' in this alternate embodiment is extended to engage within a recess 200 of a thrust plate 202 having a stem 204 on which is slidably mounted a thrust collar 206 to which the axial movement of plate 202 is transmitted through rollers 208. Thrust collar 206, like thrust pin 28 of the preferred embodiment, has a shouldered head 210 against which one end of a compressible spring 212 engages, spring assembly 212 being confined therebetween and flanged portion 42' of a cam member 40'. Cam member 40' also has a separate sleeve 240 associated therewith which functions as a guide for centering and confining axial adjustment of the thrust collar 210 and in a manner generally similar to the action of the extension portion 50 of cam member 40 of the preferred embodiment of FIGURE 1. In this embodiment, a slightly different spring structure is illustrated at 212. It will be understood, of course, that either form of spring means may be used in the two embodiments. Furthermore, an integral compression spring might be substituted therefor.

Cam member 40', like its counterpart 40 of FIGURE 1, is provided with alternate lands 106' and depressions 104' with which rollers 76 are cooperatively related, the rollers being supported by the previously mentioned cage 80 and ring 82 and urged into bearing relation with the cam surface 102 containing said depressions and lands by a nut 82 threadedly connected in the bore 12 of body member 10. However, in this arrangement a bolt supported torsion screw 214 is provided within cam member 40, and having one end fixed thereto as at 216 and having its opposite end pinned as by means 218 to the nut 82. Consequently, when handle 66 is moved to the right of FIGURE 7, it pulls cam member 40' therewith so as to bring its depression 104' into alignment with rollers 76, rollers 76 similarly moving with the cam member 40' against the action of tensioning spring 112 previously described. Rollers 76 roll with rotation of the cam and eventually fall into the depressions 104' allowing the cam member 40' to move to the left of FIGURE 6, thus relieving the compressing action of the spring 212 on the torque screw 26' and its threaded connection in the threaded bore 22' of casing 14'. This allows spring 212 to expand so as to take the pressure off the mating threads 22' and 24' of the torque screw 26' of casing 14' whereupon torsion spring 70 connected to the retainer ring 54 will return pointer 58 to its zero position on dial 60 adjacent stop pin 64 as before. Said movement of arm 66 produces a counter torque action on torsion spring 214 so that upon release of the arm 66, spring 214 acts to return the arm 66 to its original position as indicated in FIGURE 7. As the arm is thus returned, rollers 76 disengage from the depressions 104' and tension spring 112 functions to realign rollers 76 and their supporting cage 80 and cage ring 82 for the next test, the rollers again engaging lands 106' between the depressions 104'. It will be understood, of course, that torque screw 26' and its bushing 14' with which it is threadedly connected are also constructed of materials having stable and predictable as well as low coefficients of friction, such as previously described above with reference to the preferred embodiment. Also there may be circumstances when it is desirable to provide a small bearing 220 about the end of the torque screw 26' to steady the screw against possible side thrust which could effect the accuracy of the torque tester. Such bearings can also be provided in the preferred embodiment. If such bearings 220 are used, the face of the housing 10 is suitably recessed as at 224 to provide space therefor and the bearings are enclosed by a ring 224. The ring may also serve to assist in mounting torsion spring 70.

It will, of course, be understood that a torsion spring such as spring 214 of the FIGURES 6 and 7 embodiment may be conversely employed in the FIGURES 1 and 3 embodiment to replace the tensioning springs 118 and 120 and their related structures. Conversely said tensioning springs 118 and 120 of the preferred embodiment might be substituted for the torsion spring 214 in the embodiment according to FIGURES 6 and 7. Said alternate embodiment also can be provided with a protecting washer 132 retained by a snap ring 134 or equivalent means as in the preferred embodiment, if that should be desired. It may also have a handle 120 as shown, and/or also provided with mounting flanges 124. Furthermore, although cam members 40 and 40' are shown provided with spaced cylindrically shaped radially extending depressions to receive the rollers 76, cam nut 82 might be provided with such depressions and the rollers mounted on the cam members 40 or 40'. Furthermore, any other shape for the depressions 104 or 104' might be utilized and/or another shape of camming surface provided which will permit member 40 or 40' to move away from the torsion screw 26 and 26' in order to relieve compression of the spring 48 or 212, thereby permitting the torsion of spring 70 to return the pointer 58 to the zero position.

Many other modifications and/or rearrangements of parts and substitutions therefor can also be made within the scope of the invention as defined by the appended claims. For example, the unit could be made sufficiently small as to be held in one hand of the workman and could be provided with a pistol grip or T-shaped handles for such a purpose.

In FIGURE 8, a simple form of a torque tester is shown, which is, particularly adapted for portable use, distinguishing from the previously described embodiments, however, in that the torque screw must be reset manually.

Referring to FIGURE 8, a torque screw 26" of hardened steel has external threads 24" which mate with the threads 22" of an internally threaded bushing 14" retained within the bore 12" of a housing 10" and secured against rotation by a set screw 16". Said torque screw 26" has an outer end 28" on which an adapter such as described and shown by FIGURES 4 and 5 might be mounted, as in the FIGURE 1 embodiment or to which the rotary tool might be directly attached. The inner end of the torque screw 26" engages a ball member 32" received within the recessed end of a thrust pin 38", said pin having a shoulder at 46" which engages one end of a spring 248. This spring although shown as constructed generally similar to spring 212 of the embodiment of FIGURES 6 and 7, might be constructed along the lines of the spring assembly 48 of the preferred embodiment of FIGURES 1 and 3. Threadedly connected about the opposite end of thrust pin 38" is a sleeve 240 so that the spring 240 is confined therebetween and shouldered portion 46" of the thrust pin 58". Adjacent the outer end 28" of the torque screw 26" is an annular member 250 threadedly connected with torque screw 26" and retained by a set screw 252 against rotation relative thereto. Said member 250 has a pointer 258 secured thereto and housing 10" is provided with a scale 260 which extends about its periphery and in associated relation with said pointer 258.

It will thus be seen that torque applied to end 28" from a rotary tool, with which the device is mounted, will be converted into thrust action by means of thrust bearing 32" to pin 38" and be balanced by the spring assembly 248. Ring 250 being secured to torque screw 26" turns therewith so that the annular displacement of pointer 258 may be read against scale 260.

Since this embodiment of the invention has no means for relieving the compression of the spring 248, the torque screw 26" must be manually counter-turned to reset the pointer 258 at a zero position on scale 260 and is therefore primarily intended for testing rotary tools when the applied torque is small.

From the above description of preferred embodiments of the invention, it will be recognized that all of the objects and advantages as well as features of the invention are obtainable and in an exceedingly simple yet practical and economical manner.

Thus having described by invention, I claim:

1. A device for measuring the torque output of a rotary tool comprising a bushing having an internally threaded bore, an externally threaded torque screw member threadedly connected within said bore so as to move axially forward in said bore when turned in response to torque applied to an end of said screw member, spring means arranged to provide a counter force to the axial movement of said torque screw member, the angle through which the screw member is turned being indicative of the value of the applied torque, the counter force of the spring means effectively locking the torque screw against turning or release of the applied torque, means for relieving the counter force of the spring means, and means which turn the torque screw member back to its starting position on relief of said counterforce of the spring means.

2. A device for measuring the torque output of a rotary tool comprising a first member having an internally threaded bore, an externally threaded torque screw member threadedly connected thereto and freely rotatable in said bore when not axially loaded, the threads of said two members mating and the coefficient of sliding friction between the mating threads being stable and of predictable value for given pressures and rotary speed of applied torques, spring means arranged to resist the axial movement of said screw member such that the angle through which the torque screw member is turned will indicate the amount of torque applied thereto, means for relieving the resisting action of the spring means, and means for reverse turning of the torque screw member to its initial position on relief of said action of the spring means.

3. A device for measuring the torque output of a rotary tool comprising a first member having an internally threaded bore, an externally threaded torque screw member in said bore, the threads of said two members mating, an indicator adapted to turn with said torque screw member, compressible spring means arranged to resist the axial movement of said thrust member such that angular displacement of the indicator through turning of the torque screw will be a measure of the amount of torque applied thereto, means for relieving the compression of the spring means, and means to return the torque screw member on relief of said compression of the spring means to reset the indicator.

4. A device for measuring the torque output of a rotary tool comprising a first member having an internally threaded bore, an externally threaded torque screw member in said bore, the threads of said two members mating and the coefficient of sliding friction between the mating threads being of stable and predictable value for given pressures and rotary speeds of applied torque, an indicator adapted to turn with said torque screw member, a thrust member arranged for axial movement in response to torque applied to said screw, compressible spring means arranged to resist the axial movement of said thrust member such that angular displacement of the indicator through turning of the torque screw will be a measure of the amount of torque applied thereto, means for relieving the compression of the spring means, and means to permit reverse turning of the torque screw member and reset of the indicator for reuse of the device.

5. A device for measuring the torque output of a rotary tool comprising a first member having an internally threaded bore, an externally threaded torque screw member in said bore, an indicator adapted to turn with said torque screw member to indicate an angle through which the screw member is turned, a thrust member axially aligned with said torque screw member and confined for axial movement in response to torque applied to said screw, compressible spring means arranged to resist the axial movement of said thrust member such that the aforesaid angular displacement of the indicator will be a measure of the amount of torque applied to the torque screw, and means for relieving the compression of the spring means, and means to return the torque screw member upon relieving the compression of the spring means to reset the indicator.

6. A device for measuring the torque output of a roary tool comprising a first member held against rotation and having an internally threaded bore, an externally threaded torque screw member in said bore, and threadedly connected thereto, said screw member moving axially inwardly of said first member when it is rotated by torque applied to an end thereof, spring means arranged to resist said inward axial movement of the torque screw member, an indicator adapted to turn with said torque screw member, a stop, and resilient means to resist said turning of the torque screw so as to urge said indicator against the stop, the force of said resilient means being insufficient to resist turning of the torque screw member when torque is applied thereto within the range of values the device is intended to measure whereby angular displacement of the indicator through turning of the torque screw is utilized to indicate the amount of torque applied to the torque screw member, the resisting force developed in the spring means reflecting the applied torque whereby the indicator will hold the angular position to which it is displaced by the applied torque, and means for relieving the resisting force of the spring means, the force of the resilient means being thereupon sufficient to turn the torque screw member so as to return the indicator to its position against the stop.

7. In a device for measuring the torque output of a rotary tool, a bushing having an internally threaded bore, an externally threaded torque screw threadedly connected within said threaded bore of the bushing, said torque screw having an exposed end to receive torque of a rotary tool, a thrust member at the opposite end of said torque screw axially aligned therewith, the thrust member being confined for axial movement in response to a force exerted thereon by torque applied to the torque screw, a cam member, spring means arranged between said cam member and the thrust member to resist axial movement of the thrust member, an indicator carried by said torque screw to turn therewith, stop means, resilient means to hold the indicator against the stop means, the force of said resilient means being less than the torque applied to the torque screw in the range of torques to be measured but sufficient to overcome the friction of the threaded connection when the spring means is in its normal expanded state, said cam member being actuatable to release the compression of the spring means and allow it to return to a normal expanded state, whereby the force of the resilient means can return the indicator to the stop means.

8. In a device for measuring the torque output of a rotary tool, a bushing, having an internally threaded bore, an externally threaded torque screw threadedly connected within said threaded bore of the bushing, said torque screw having an exposed end to receive the torque of a rotary tool, the torque screw being freely rotatable on its threaded connection with the bushing so that the screw readily moves in an axial direction when turned, a cam member, spring means arranged between said cam member and the torque screw to resist said axial movement of the torque screw, an indicator carried by said torque screw to turn therewith, stop means, resilient means to hold the indicator against the stop means, the force of said resilient means being less than the torque applied to the torque screw in the range of torques to be measured, but sufficient to overcome the friction of the threaded connection when the spring means is in its normal expanded state, said cam member having alternate lands and depressions in one surface, and means normally engaging said lands against the spring means, said cam member being actuatable to allow said depressions to receive said means to allow the cam member to move away from the spring means to provide space in which the spring means may return to a normal expanded state, whereby the force of the resilient means can return the indicator to the stop means.

9. In a device for measuring the torque output of a rotary tool, a bushing having an internally threaded bore, an externally threaded torque screw threadedly connected within said threaded bore of the bushing, said torque screw having an exposed end to receive the torque of a rotary tool, a thrust member at the opposite end of said torque screw axially aligned therewith, to move axially in response to a force exerted thereon by torque applied to the torque screw, a cam member, spring means arranged between said cam member and the thrust member to resist axial movement of the thrust member, an indicator carried by said torque screw to turn therewith, stop means, resilient means to hold the indicator against the stop means, the force of said resilient means being less than the torque applied to the torque screw in the range of torques to be measured but sufficient to overcome the friction of the threaded connection when the spring means is in a normal expanded state, said cam member having on its side opposite to the spring means alternate lands and depressions, rollers normally engaging said lands, and said cam member being rotatable to bring said rollers into the depressions and cause the cam member to move away from the spring means allowing it to return to a normal expanded state, whereby the force of the resilient means can return the indicator to the stop means.

10. In a device for measuring the torque output of a rotary tool, a first member having an internally threaded bore, a torque screw of hardened steel threadedly connected therewith and having an exposed end to receive the torque of a rotary tool, the coefficients of sliding friction between the threads of the screw and first member being of predictable values for given torque pressures and speeds of rotation, a thrust member at the opposite end of said torque screw and axially aligned therewith, bearing means between said torque screw and the thrust member, the thrust member being confined for axial movement in response to a force exerted thereon through said bearing means when torque is applied to the torque screw, a cam member rotatably mounted to turn about the axis of said thrust member and slidable along said axis, spring means between said cam member and a portion of the thrust member to resist axial movement thereof and thereby turning of the torque screw, rollers behind the cam member to resist axial sliding movement of the cam member in a direction away from the spring means, an indicator carried by said torque screw to turn therewith, a scale associated with said indicator, stop means at the zero point of said scale means, resilient means to hold the indicator against the stop means, the force of said resilient means being less than the torque applied to the torque screw in the range of torques to be measured, but sufficient to overcome friction of the threaded connection when the spring is in a relaxed state, said side of the cam member engaged by the rollers having alternate lands and depressions thereof, the rollers normally engaging the lands, and means for rotating said cam member to align the depressions with the rollers, the reception of said rollers in the depressions serving to allow the cam member to move away from the spring means under the compressive force thereof allowing expansion of said spring means to a normal expanded state, whereby the resilient means will return the indicator means to the stop means.

11. In a device for measuring the torque output of a rotary tool, a housing, a bushing non-rotatably mounted in said housing and having an internally threaded bore, an externally threaded torque screw threadedly connected within said threaded bore of the bushing, the mating threads of said bushing and screw having a smooth finish and a coefficient of friction therebetween, said torque screw having an exposed end to receive the torque of a rotary tool, a thrust member at the opposite end of said torque screw and axially aligned therewith, bearing means between said torque screw and the thrust member, the thrust member being confined for axial movement in response to a force exerted therein through said bearing means by torque applied to the torque screw, a cam member rotatably mounted to turn about the axis of said thrust member and slidable axially of the thrust member, spring means arranged between said cam member and a portion of the thrust member, said cam member having alternate depressions and lands on its opposite side and rollers normally engaging said lands to prevent the cam member from sliding away from the spring means, an indicator carried by said torque screw to turn therewith, stop means on said housing, a torsion spring adapted to hold the indicator against the stop means, the torsion of said torsion spring being less than the torque applied to the torque screw in the range of torques to be measured but sufficient to overcome the friction of the threaded connection of the torque screw with the bushing when the spring means is in its normally expanded state, means to rotate said cam member so as to locate its depressions to receive the rollers, the reception of said rollers in the depressions allowing the cam member to slide in a direction away from the spring means so that the spring means returns to its normal expanded state, whereby the force of the resilient means can turn the torque screw and return the indicator means to the stop means, and means for restricting movement of the rollers such that the cam member may be rotated to sufficiently move the depression beyond the rollers whereby they will again engage the lands, and means for tensioning the cam against rotation.

12. In a device for measuring the torque output of a rotary tool, a housing, a bushing non-rotatably mounted in said housing, said bushing being of oil impregnated sintered bronze and having an internally threaded bore, an externally threaded torque screw of hardened steel threadedly connected with said bushing, the mating threads of said bushing and screw having a smooth finish and said torque screw having an exposed end to receive the torque of a rotary tool, the coefficients of sliding friction between the mating threads of the screw and bushing being of predictable values through a predetermined range of pressures and speeds of rotation, a thrust member at the opposite end of said torque screw and axially aligned therewith, bearing means between said torque screw and the thrust member, the thrust member being confined for axial movement in response to a force exerted therein through said bearing means by torque applied to the torque screw, a cam member rotatably mounted to turn about the axis of said thrust member and slidable axially thereof, spring means arranged between said cam member and a portion of the thrust member, said cam member having spaced depressions on its reverse side with lands therebetween, rollers normally engaging said lands to prevent axial movement of the cam member in a direction away from the spring means, whereby the spring means resist axial movement of the thrust member, an indicator carried by said torque screw to turn therewith, the arcuate distance through which said indicator turns being an indication of the torque applied, and scale means associated with said indicator and calibrated to indicate the torque which is represented by different angular displacements of the indicator, stop means against which the indicator rests in its zero position, a torsion spring adapted to hold the indicator against the stop means, the torsion of said torsion spring being less than the torque usually applied to the torque screw through the range of torques the device is intended to measure but sufficient to overcome the friction of the threaded connection of the torque screw with the bushing when the spring means is in a relaxed state, a handle connected to said cam member to rotate the same and locate the depressions in the reverse side of the cam member to receive the rollers to permit axial movement of the cam member away from the spring means sufficient to allow expansion thereof to an extent such as to relieve the exerted force on the torque screw, whereby the force of the torsion spring can return the indicator means to the stop means, and means for restricting movement of the rollers so that the cam member may be rotated to move its depressions beyond the rollers whereby they will again engage the lands, and means for tensioning the cam against rotation, said stop means against which the indicator means is held in its zero position being notched to permit the indicator to pass the stop means when turned by the torque screw in excess of a full turn, said indicator and scale means being enclosed by a transparent cover, and a smaller diametered shielding washer on the exposed end portion of the torque screw inwardly of its end to protect the transparent cover from being accidentally struck by a misaligned rotary tool in attempts at fastening the tool to said end of the torque screw.

References Cited in the file of this patent

UNITED STATES PATENTS

| | | |
|---|---|---|
| 2,503,649 | Zimmerman | Apr. 11, 1950 |
| 2,635,453 | Gentry et al. | Apr. 21, 1953 |
| 2,786,726 | Tarr | Mar. 26, 1957 |
| 2,893,793 | Ryshavy | July 7, 1959 |
| 2,945,374 | Simmons | July 19, 1960 |